United States Patent [19]

Schneider

[11] Patent Number: 5,230,499
[45] Date of Patent: Jul. 27, 1993

[54] EXTENDIBLE AND RETRACTABLE LEG WITH INTERNAL SPRING

[75] Inventor: Robert H. Schneider, Beaver Dam, Wis.

[73] Assignee: Versa Technologies, Inc., Racine, Wis.

[21] Appl. No.: 703,488

[22] Filed: May 21, 1991

Related U.S. Application Data

[62] Division of Ser. No. 327,539, Mar. 23, 1989, abandoned.

[51] Int. Cl.⁵ .................................................. B60S 9/02
[52] U.S. Cl. ..................................................... 254/423
[58] Field of Search ................ 254/418, 423, 93 R, 254/93 VA, 93 A, 93 H

[56] References Cited

U.S. PATENT DOCUMENTS

| | | | |
|---|---|---|---|
| 1,323,688 | 12/1919 | Graham et al. | 254/423 |
| 1,548,182 | 8/1925 | Burgin | 254/423 |
| 1,557,385 | 10/1925 | Tastenhoye | 254/423 |
| 1,873,116 | 8/1932 | Dessaint | 254/423 |
| 4,377,190 | 3/1983 | Pierrat | 144/93 |
| 4,523,743 | 6/1985 | Wang | 254/93 H |

Primary Examiner—J. J. Swann
Attorney, Agent, or Firm—Andrus, Sceales, Starke & Sawall

[57] ABSTRACT

A telescoping assembly includes an inner tubular member and an outer tubular member, each defining an internal passage. The inner and outer tubular members are mounted to each other for telescoping movement therebetween, and a pair of coaxial springs are mounted within the internal passages defined by the inner and outer tubular members. The springs act to bias the tubular members toward a retracted position. The tubular members are movable to an extended position against the force of the springs, by introduction of pressurized fluid into the internal passages defined by the inner and outer tubular members. A valve is mounted to an end of one of the tubular members, for introducing pressurized fluid into the internal passages defined by the tubular members, and for allowing fluid to be expelled therefrom under the force of the springs, for allowing the inner and outer tubular members to move to their retracted position.

3 Claims, 5 Drawing Sheets

EXTENDIBLE AND RETRACTABLE LEG WITH INTERNAL SPRING

CROSS-REFERENCE TO RELATED APPLICATION

This application is a division of application Ser. No. 07/327,539, filed Mar. 23, 1989, now abandoned.

BACKGROUND AND SUMMARY

This invention relates to an air/hydraulic system for raising and lowering a load, such as for use on with a trailer or the like.

Various systems are known and used for lifting an lowering of a load such as a trailer. In most such systems, it is generally necessary for pressurized air to be supplied to the system whenever it is desired to raised or lower the legs. Further, such systems generally require a pair of oil reservoirs, one of which supplies oil to a booster pump for extending the legs, the other of which provides oil under pressure for retracting the legs by means of a manual retraction pump or the like.

The present invention is designed to provide a simplified system for rasing and lowering legs for use on a trailer or the like. In accordance with the invention, a pressurized fluid operated lifting and lower system includes one or more fluid operated extendible and retractable legs, with each leg including biasing means urging the legs to retract. Lock valve means is associated with each leg and is movable between an open position and a closed position. The lock valve means in its open position allows fluid flow to or from the leg, and in its closed position prevents fluid flow to or from the leg. The lock valve means preferably includes a movable internal member which selectively allows fluid flow therethrough. The lock valve means is normally urged to its closed position.

Selectively actuable extension means is provided for moving the lock valve means to its open position and selectively supplying pressurized fluid to the leg to overcome the biasing means and to cause the leg to extend. To extend the legs under load, a booster pump is manually actuated by means of a booster valve which selectively supplies pressurized air to the booster pump. The booster pump draws fluid from the reservoir, and pumps intensified fluid pressure to the legs to extend the legs. Operation of the booster pump provides pressurized fluid to the lock valve, which opens the lock valve and passes into the leg for extending the leg. When pressurized fluid is not supplied to the lock valve, the lock valve returns to its closed position to prevent fluid flow therethrough.

Selectively actuable retraction means is provided for moving the lock valve means to its open position. The retraction means preferably includes means for simultaneously cutting of the supply of pressurized air to the system when the lock valve means is moved to its open position. When this occurs, fluid is allowed to be expelled from the leg due to retraction of the leg by the action of the biasing means. In a preferred embodiment, the retraction means is a pressurized fluid actuated system.

A master valve is provided for moving the lock valve to its open position when pressurized fluid is not supplied thereto, for allowing fluid to be expelled to retract the legs. The master valve is preferably interconnected with an air valve so that actuation of the master valve controls the supply of pressurized air to the system. The master valve is movable between an extend position and a retract position, with a neutral position midway between the extend and retract positions. The master valve is preferably interconnected with the fluid reservoir mentioned above, and in its retract position supplies fluid pressure to an external actuator which moves the lock valve to its open position for allowing fluid to flow therethrough to retract the legs. The master valve includes a piston disposed within a passage, with the passage being interconnected with the external lock valve actuating means. A first opening provides communication between the passage and the reservoir, and a second opening provides communication between the passage and the lock valve. A third opening provides communication between the legs and the reservoir. When in its retract position, the master valve piston covers the first opening to cut off the supply of fluid pressure thereto, while maintaining fluid pressure in the line communicating the passage with the external actuating means. In this position, the third opening is exposed so as to allow fluid flow from the leg through the lock valve and the third opening, and back into the reservoir. As noted, the supply of pressurized air to the reservoir is cut off and vented so as to allow flow of fluid to the reservoir.

BRIEF DESCRIPTION OF THE DRAWINGS

The drawings illustrate the best mode presently contemplated of carrying out the invention.

In the drawings.

DETAILED DESCRIPTION OF THE PRIOR ART

Figure 1:
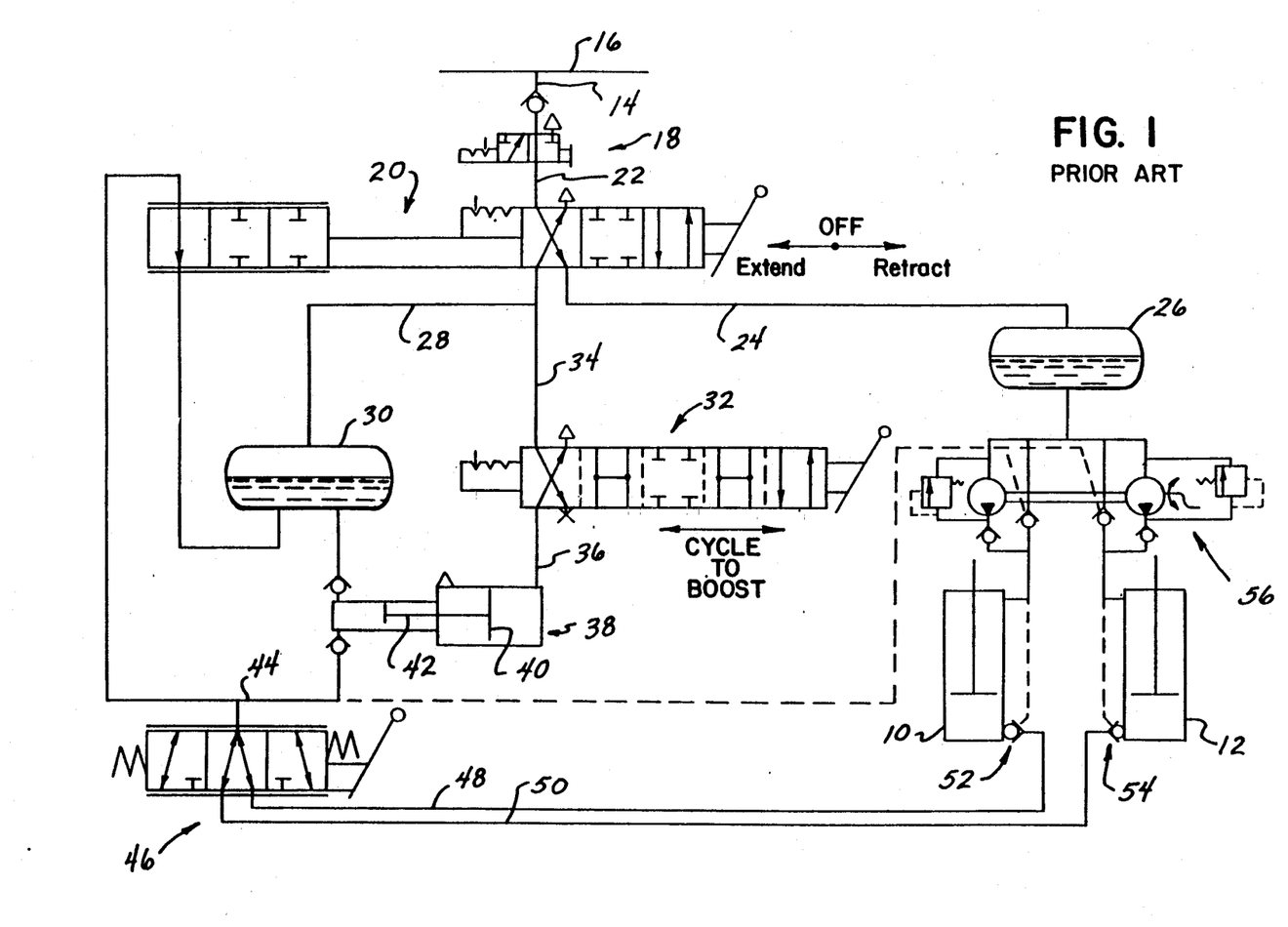
FIG. 1 is a schematic representation of a prior art system for lifting and lowering of legs adapted for mounting to a trailer.

Referring to FIG. 1, a prior art system for lifting and lowering of a pair of legs 10, 12, in the form of hydraulically actuated cylinders, includes a conduit 14 adapted for connection to a pressurized air conduit 16, such as the emergency brake line of a tractor/trailer combination. Legs 10, 12 are adapted for connection to the underside of a trailer. An isolator valve 18 is movable between an operating position as shown, and a venting position. A master valve 20 is connected with isolator valve 18 by means of a conduit 22. Master valve 20 is a three position valve in which the center position represents an "off" position, the leftwardmost position an "extend" position, and the rightwardmost position, as shown, a "retract" position. A conduit 24 interconnects master valve 20 with a retract side oil tank 26, and a conduit 28 interconnects master valve 20 with an extend side oil tank 30. A reciprocable booster valve 32 is interconnected with master valve 20 by means of a conduit 34, and a conduit 36 interconnects booster valve 32 with a booster pump 38. As is known, booster pump 38 includes a piston 40 and a stem 42. When master valve 20 is in its extend position, tank 30 is pressurized and tank 26 is vented. The pressurization of tank 30 causes fluid to flow through booster pump 38 to a conduit 44 and a leveling valve 46, and through a pair of conduits 48, 50 to a pair of lock valves 52, 54 associated with legs 10, 12, respectively to extend the legs to ground. Thereafter, air pressure alone cannot lift the load, and booster valve 32 is cycled so as to selectively provide pressurized air to the air side of piston 40, the end of stem 42 provides fluid pressure through conduit 44 and leveling valve 46 to conduits 48, 50, and lock valves 52, 54, thereby causing further extension of legs 10, 12. A manual retract pump 52 is provided for retracting legs 10, 12. When master valve 20 is placed in its retract position, tank 30 is vented and tank 26 is pressurized by air passing through conduit 24. Pressurized fluid passages through a hand pump 56 to simultaneously open lock valves 52, 54 and supply pressurized fluid to retract legs 10, 12, respectively. When master valve 20 is in its retract position, an additional passage in master valve 20 connects conduit 24 to tank 30 to allow fluid to be expelled from legs 10, 12. When air is absent from conduit 16, hand pump 56 provides a means to retract legs 10, 12 by drawing oil from tank 26 due to generation of a partial vacuum, and generating pressurized fluid to simultaneously open lock valves 52, 54 and supply pressurized fluid to retract legs 10, 12.

DETAILED DESCRIPTION OF THE PREFERRED EMBODIMENT

Figure 2:
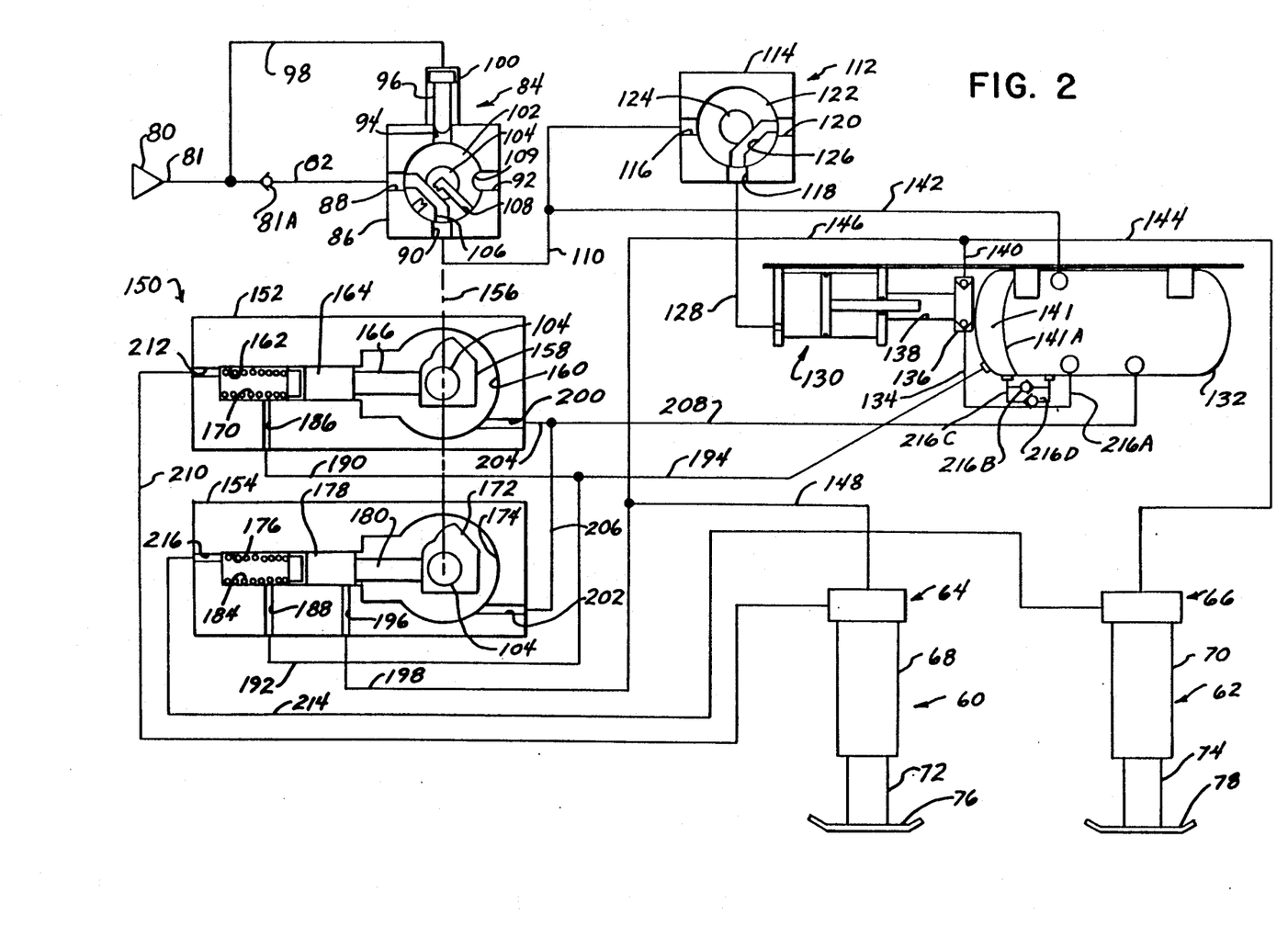
FIG. 2 is a schematic representation of the lifting and lowering system according to the invention.

Referring to FIG. 2, a pair of legs 60, 62 are adapted for connection to the underside of a trailer or the like. Legs 60, 62 include upper housings 64, 66, fixed upper portions 68, 70 extendible and retractable lower portions 72, 74, and feet 76, 78. The details of construction of legs 60, 62 will be described hereafter.

As in the prior system, a glad hand 80 is adapted for connection to a source of pressurized air, such as the emergency brake line of a tractor or the like. A conduit 81 interconnects glad hand 80 with a check valve 81a, a conduit 82, and an air valve 84. Air valve 84 includes a body 86 having ports 88, 90 and 92. Air valve body 86 further includes a hole 94 which receives a slidably mounted retaining member 96. As shown, a conduit 98 is provided between air conduit 81a and a housing 100 within which retaining member 96 is disposed, so that pressurized air is provided to the head of retaining member 96 when pressurized air is supplied to the system.

Air valve 84 includes a rotor 102 mounted to a shaft 104. Passages 106, 108 open onto the outer face of rotor 102. A depression 109 is provided on the outer edge of rotor 102.

Conduit 82 is connected to air valve port 88, and a conduit 110 is connected between air valve port 90 and a booster valve 112. Booster valve 112 is constructed somewhat similarly to air valve 84, including a body 114 having ports 116, 118, 120, and a rotor 122. Rotor 122 is mounted to a rotatable shaft 124, and is provided with a passage 126.

A conduit 128 interconnects booster valve port 118 with the air side of an air/hydraulic booster pump 130 of conventional construction. The oil side of booster pump 130 receives oil from a tank 132 through a conduit 134. A double check valve 136 is disposed between booster pump 130 and conduit 134. Check valve 136 provides one-way flow of oil from tank 132 to a pumping chamber 138 associated with booster pump 130 during the suction stroke of the booster pump, and one-way flow of oil from pumping chamber 138 to a conduit 140 during the pumping stroke.

A tank 141 is piggybacked onto tank 132 and is separated from tank 132 by means of a cap, shown at 141a.

A conduit 142 is provided between air conduit 110 and tank 132 for pressurizing oil within tank 132 when pressurized air is supplied to the system, and for venting tank 132 when air valve 84 is put in its off or retract position.

A conduit 144 interconnects conduit 140 with upper housing 66 of leg 62. A conduit 146 interconnects conduit 140 with upper housing 64 of leg 60 through a conduit 148.

A master valve, illustrated schematically at 150, includes a pair of side-by-side body portions 152, 154. Air valve 84 is interconnected with master valve 150 such that shaft 104 extends through master valve body portions 152, 14 to provide simultaneous operation of air valve 84 and master valve 150. This commonality of valve shaft 104 with air valve 84 and master valve body portions 152, 154 is illustrated by dashed conduit 156.

A cam actuator 158 is connected to valve shaft 104 at body portion 152, and is housed within a cavity 160. Body portion 152 is provided with a passage 162 in communication with cavity 160. A piston 164 is slidably mounted within passage 162, and a stem 166 is connected to piston 164 and bears against cam actuator 158. A spring 170 biases piston 164 and stem 166 against cam actuator 158.

In a like manner, a cam actuator 172 is mounted to valve shaft 104 at body portion 154, and is housed within a cavity 174. Cavities 160, 174 are in communication with each other. A passage 176 is provided in body portion 154, within which is disposed a piston 178. A stem 180 extends between piston 178 and a cam actuator 172. A spring 184 biases piston 178 and stem 180 against cam actuator member 172.

Openings 186, 188 communicate between passages 162, 176, respectively, and conduits 190, 192, respectively. Conduits 190, 192 unite in a conduit 194 which interconnects conduits 190, 192 with tank 132.

An opening 196 communicates between passage 176 in body portion 154 and a conduit 198, which communicates with conduits 146, 148.

Passages 200, 202 are formed in body portions 152, 154, respectively and communicate between cavities 160, 174, respectively and conduits 204, 206, respectively which unite in a conduit 208 to provide communication with tank 132.

A conduit 210 extends between an opening 212 in body portion 152 and upper housing 64 associated with leg 60. Likewise, a conduit 214 extends between an opening 216 in body portion 154 and upper housing 66 associated with leg 62. Openings 212, 216 are in communication with passages 162, 176, respectively in body portions 152, 154.

A conduit 216a connects tank 132 with a check valve 216b, which allows pressurized fluid to flow from tank 132, conduit 216a and check valve 216b to a conduit 216c and to enter tank 141. Check valve 216b allows pressurized fluid to fill tank 141 when tank 132 is pressurized. Conduit 216c connects tank 141 to a check valve 216d, which is connected by conduit 216a to tank 132. Check valve 216d has an opening bias which results in pressure being maintained in tank 141 at all times.

Figures 3, 6, 9:
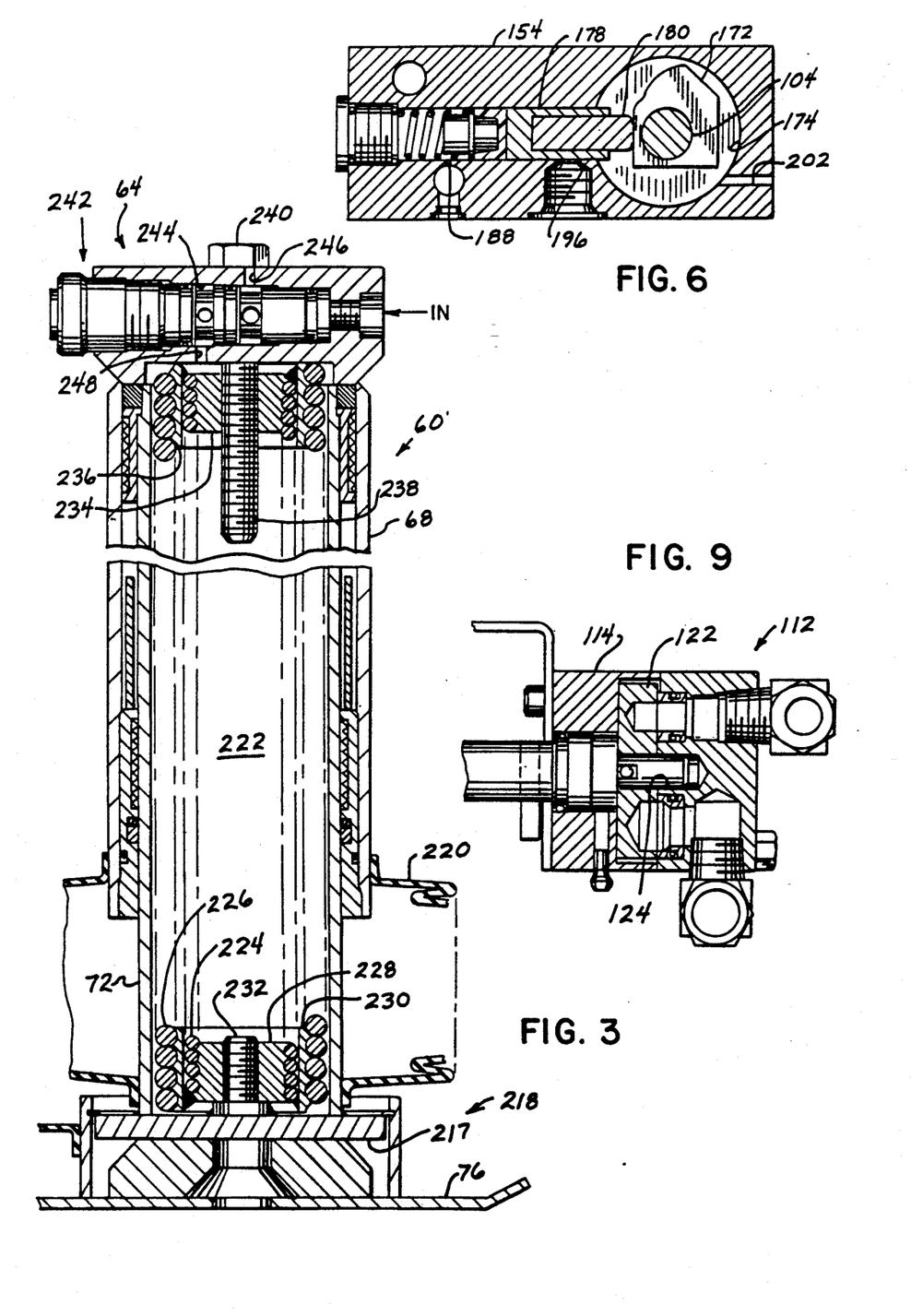
FIG. 3 is a sectional view of a leg for use in the system of FIG. 2, with a lock valve constructed according to the invention mounted to its upper end.
FIG. 6 is a sectional view taken generally along line 6—6 of FIG. 5, showing the master valve in its extend position.
FIG. 9 is a sectional view of the booster valve for use in the system of FIG. 2.

With reference to FIG. 3, leg 60 is illustrated in detail. It is understood that legs 60, 62 are identical in construction, so that the description of leg 60 applies equally to leg 62.

As shown, upper housing portion 64 is mounted to the upper end of fixed upper portion 68, which is in the form of a substantially cylindrical tube. Extendible and retractable lower portion 72 is also in the form of a substantially cylindrical tube, having a smaller diameter than that of upper portion 68. Upper portion 68 and lower portion 72 are substantially coaxial. Lower portion 72 is mounted for slidable movement relative to upper portion 68, and spacers and seals are provided in the gap between upper portion 68 and lower portion 72.

Lower portion 72 has a cap 217 fixed at its lower end, to which a soft shoe assembly 218 is connected, of which foot 76 is a part. The construction of shoe assembly 218 is known in the art. A rubber boot 220 extends between the lower end of lower portion 72 and the lower end of fixed upper portion 68, acting to prevent contamination of the seals disposed between upper portion 68 and lower portion 72.

Lower portion 72 includes an internal cavity 222. A pair of coaxial coil springs are mounted within cavity 222. The inner coil springs is illustrated at 224, and the outer coil spring is illustrated 226. Springs 224, 226 are mounted at their lower ends to inner and outer end members 228, 230, respectively, which are connected together by welding or the like. Inner end member 228 includes an internally threaded passage for receiving a bolt 232, which extends upwardly from cap 217 to fix springs 224, 226 relative to the lower end of lower portion 72. In a similar fashion, springs 224, 226 are fixed at their upper ends to upper inner and outer end members 234, 236, which are connected together such as by welding or the like. Upper inner end member 234 includes an internally threaded passage for receiving a bolt 238, which is adjustable to provide a selected amount of pretension in springs 224, 226. As shown, bolt 238 extends through upper housing 64 so that its head portion, shown at 240, is disposed adjacent the upper surface of upper housing 64.

With continued reference to FIG. 3, a lock valve assembly, shown generally at 242, is mounted within a substantially horizontal passage, shown at 244, provided within upper housing 64. An upper passage 246 is provided in housing 64 for communication between passage 244 and the outer surface of housing 64, and a lower passage 248 is formed in housing 64 to provide communication between passage 244 and cavity 222 of lower leg portion 72.

Figure 4:
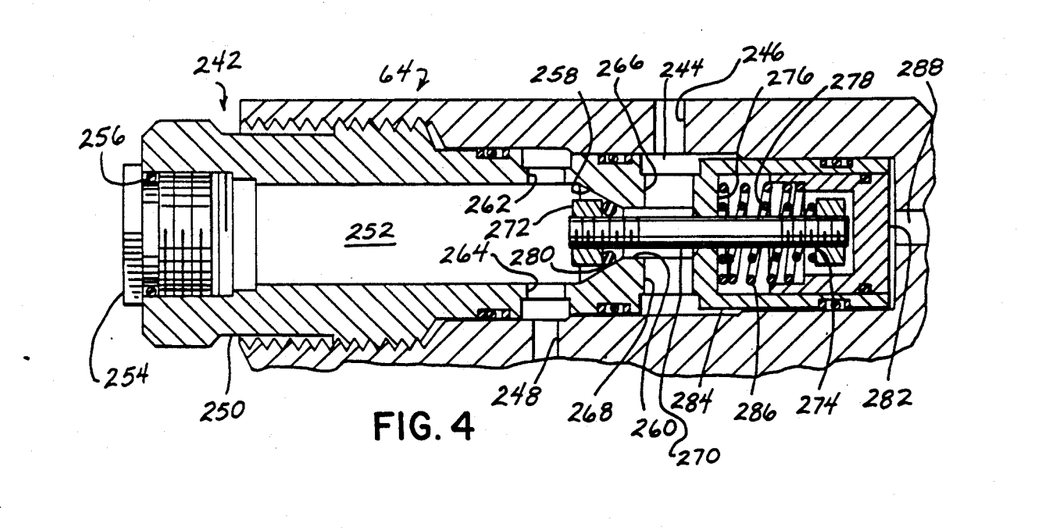
FIG. 4 is a longitudinal sectional view of the lock valve as shown in FIG. 3 mounted to the upper end of a leg.

Reference is now made to FIG. 4 which illustrates the internal construction of lock valve 242. As shown, lock valve 242 includes a body portion 250 having an internal cavity 252. A plug 254 and an O-ring 256 are mounted to the leftward end of body 250 for sealing cavity 252. An angled seat 258 is provided at the rightward end of cavity 252, which terminates in a passage 260. Ports 262, 264 provide communication between lock valve cavity 252 and housing cavity 244 at housing lower passage 248. Similarly, ports 266, 268 provide communication between lock valve passage 260 and housing cavity 244 at housing upper passage 246.

An internal plunger assembly is mounted within lock valve cavity 252 and passage 260. The plunger assembly includes a stem 270 to which a pair of end retaining rings 272, 274 are mounted. As shown, stem 270 extends through passage 260 and an end wall 276 of lock valve body portion 250. A coil spring 278 is disposed between the rightward surface of end wall 276 and the leftward surface of right retaining ring 274 so as to bias stem 270 rightwardly to its closed position as shown in FIG. 4. In this position, an O-ring 280 is sandwiched between the rightward surface of end retaining ring 272 and angled seat 258 of cavity 252, so as to normally seal cavity 252 from passage 260.

An actuating cup-shaped piston 282 is slidably mounted within a cylinder formed by a side wall 284 extending from lock valve end wall 276. A spring 286 is disposed between the rightward end of plunger stem 270. Housing 64 includes a passage 288 which is selectively provided with hydraulic fluid pressure, as will be explained, to selectively move piston 282 leftwardly against the force of spring 286 to contact plunger stem 270. When this occurs, such leftward movement of piston 282 causes leftward movement of plunger ring 272 to unseat from seat 258 to move lock valve 242 to its open position, thus providing communication between lock valve passage 260 and lock valve cavity 252.

A bleeder system is preferably interconnected with passage 288 to purge air from conduits 190, 192, 194, 214, 210, 188, 176, 216, 186, 162, 212 and 288.

Operation of the system will be described with reference to FIGS. 2, 3 and 4. When it is desired to extend legs 60, 62, master valve stem 104 is rotated until its extend position as shown in FIG. 2 is attained. In this position, pressurized air is supplied to booster valve 112 and to oil tank 132. Lower portions 72, 74 of legs 60, 62 will extend until feet 76, 78 contact the ground, due to the air pressure supplied to oil within tank 132. When feet 76, 78 contact the ground, the resistance in conduit 140 is greater than the air pressure supplied to oil in tank 132, so that the upper check valve in check valve assembly 136 remains closed. When this occurs, continued extension of legs 60, 62 is achieved by reciprocating booster valve 112 between an operative position and an inoperative position (shown in FIG. 2). In its operative position, booster valve 112 is positioned 90° clockwise from its position shown in FIG. 2, so that passage 126 provides communication between booster valve ports 116, 118 to provide air pressure through conduit 128 to the head of the booster valve piston, causing a power stroke of the piston. This forces oil from pumping chamber 138 through the upper check valve in check valve assembly 136 and into conduits 144, 146 for supply through appropriate fittings to the upper passages (such as 246, FIG. 3) in upper housings 64, 66 provided on legs 60, 62. Such pressurized fluid communicates through ports 266, 268 (FIG. 4) to passage 260, and then overcomes the biasing force provided by spring 278 to move the lock valve plunger assembly to its open position. When this occurs, such pressurized fluid passages into lock valve cavity 252 and through lock valve ports 262, 264 to housing cavity 244, then passing through lower housing passage 248 and into cavity 222 of leg lower portion 72 (FIG. 3) to extend leg 60. The same action occurs with respect to leg 62. When the booster pump power stroke is completed, the lock valve plunger returns to its closed position by the action of spring 278 so as to maintain the legs as extended. Booster valve 112 is then moved to its inoperative, or venting, position as shown in FIG. 2, wherein air supplied to the head of the booster pump piston is vented to atmosphere. When this occurs, pressurized fluid from tank 132 passes through conduit 134 and the lower check valve in check valve assembly 136 so as to fill pumping chamber 138. Booster valve 112 is then again moved to its operative position to provide another power stroke of the booster pump piston. This action is repeated until the desired amount of extension of legs 60, 62 is attained.

During extension of legs 60, 62, master valve pistons 164, 178 remain in the position as shown in FIG. 2 so that opening 196 is blocked, thereby preventing communication between openings 196 and cavity 174.

After desired extension of legs 60, 62, valve shaft 104 is returned to its neutral position, which is 45° counterclockwise from the position shown in FIG. 2. In this position, air valve 84 is positioned so that the supply of pressurized air to the system is cut off, and venting to atmosphere occurs through air valve port 90, passage 108, and port 92. Cam actuators 158, 172 assume a neutral position, in which opening 196 remains blocked and openings 196, 188 remain open.

When it is desired to retract legs 60, 62, master valve shaft 104 is moved 45° counterclockwise from the neutral position so that air valve passage 106 provides communication between air valve ports 90 and 92, thus venting any pressurized air supplied to the system to atmosphere. Pressurized air may still be applied to the system through glad hand 80, thus forcing retaining member 96 downwardly so as to engage depression 109 formed in rotor 102. This acts to maintain rotor 102, and thereby valve shaft 104, in the retract position, 90° counterclockwise from the position shown in FIG. 2 so long as air is supplied to glad hand 80.

When valve shaft 104 is rotated to the retract position as described above, cam actuator members 158, 172 force master valve pistons 164, 178 leftwardly within passages 162, 176, respectively. When this occurs, opening 196 in master valve body portion 154 is unblocked so as to provide communication between conduit 198 and master valve cavity 174. At the same time, openings 186, 188, which supply pressurized fluid to passages 162, 176 are blocked by the heads of pistons 164, 178. Leftward movement of pistons 164, 178 within passages 162, 176 provides pressurized fluid in conduits 210, 214, which is communicated to upper housings 64, 66 of legs 60, 62, respectively. Referring now to FIGS. 3 and 4, such supply of pressurized hydraulic fluid to upper housings 64, 66 is communicated through passages, such as 288 (FIG. 4) to the rightward side of the actuating pistons, such as 282, associated with the lock valves, such as 242. As described previously, this action causes the lock valve plunger to move to its open position, thus providing communication between lock valve cavity 252 and lock valve passage 260. When this occurs, the force of springs 224, 226 and/or load causes lower leg portion 72 to retract within upper leg portion 68, expelling fluid from cavity 222 through lower passage 248, lock valve assembly 242 and upper passage 246. Fluid expelled from leg 62 flows through conduits 144 and 146, and fluid expelled from leg 60 flows through conduit 148. The expelled fluid within conduits 146, 148 then flows through conduit 198 and opening 196 in master valve body portion 154 and into master valve cavities 174, 160. Such fluid then continues to flow through openings 200, 202 and conduits 204, 206 to conduit 208, and thereafter to tank 132.

It should be appreciated that leg retraction can occur whether or not pressurized air is supplied to the system, due to the presence of the springs within legs 60, 62 which urge the legs to retract. When pressurized air is supplied to the system, however, valve shaft 104 is retained in its retract position by the action of retaining member 96 engaging depression 109 in air valve rotor 102. When pressurized air is not supplied to the system through glad hand 80, valve shaft 104 must be manually held in its retract position until legs 60, 62 are fully retracted. If this is not done, a torsion spring associated with valve shaft 104 will return shaft 104 to its neutral position, thus preventing further leg retraction.

Figures 5, 7:
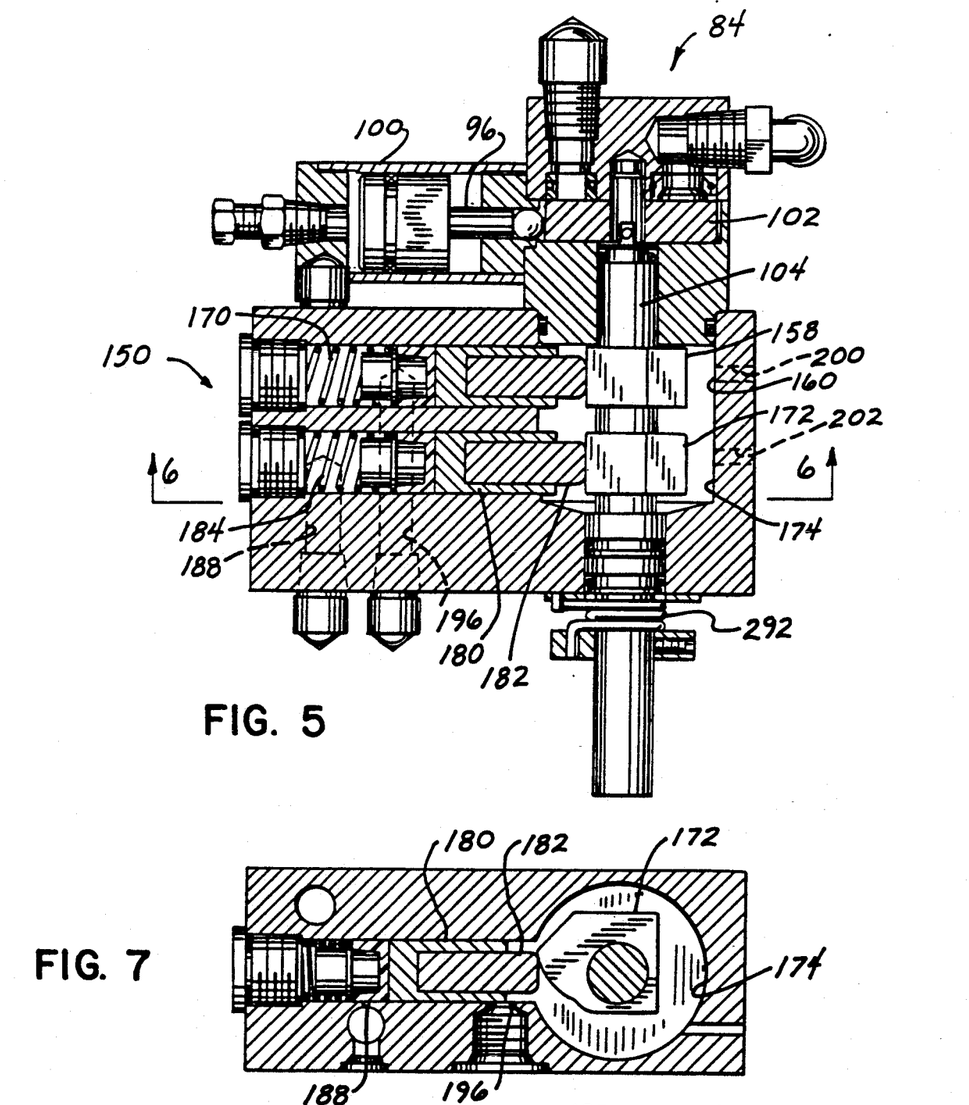
FIG. 5 is a sectional view of the master valve for use in the system of FIG. 2.
FIG. 7 is a view similar to FIG. 6, showing the master valve in its retract position.

With reference to FIGS. 5-8, a physical embodiment of master valve 150, with air valve 84 attached, is illustrated. Where possible, like reference characters from FIG. 2 will be used to facilitate clarity. With reference to FIG. 5, the torsion spring which returns master valve shaft 104 to its neutral position is shown at 292. The remainder of FIG. 5 is believed to be self-explanatory when viewed in connection with FIG. 2.

Figure 8:
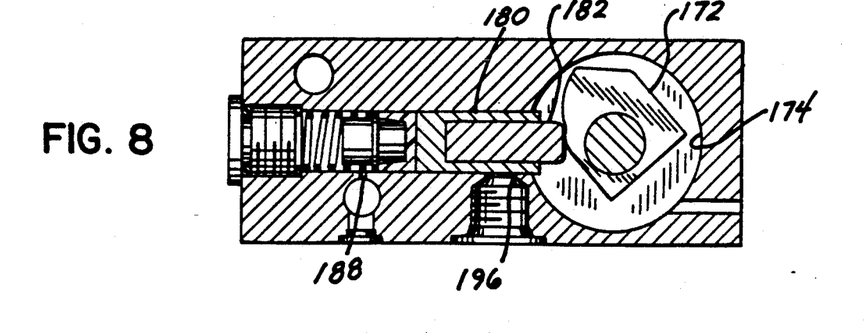
FIG. 8 is a view similar to FIG. 6, showing the master valve in its neutral position.

FIG. 6 shows master valve 150 with shaft 104 in its extend position. FIG. 7 illustrates master valve 150 with shaft 104 moved to its retract position in which cam 172 forces piston 178 to its leftwardmost position. In this position, passage 188 is blocked and passage 196 unblocked so as to provide communication with cavity 174. FIG. 8 illustrates master valve 150 in its neutral position.

FIG. 9 illustrates a physical embodiment of booster valve 112, and is believed to be self-explanatory with reference to FIG. 2.

Various alternatives and modifications are contemplated as being within the scope of the following claims particularly pointing out and distinctly claiming the subject matter regarded as the invention.

I claim:

1. A telescoping assembly, comprising:
an inner tubular member defining a first internal passage;
an outer tubular member defining a second internal passage;
wherein the inner tubular member is mounted for longitudinal telescoping movement within the second internal passage defined by the outer tubular member;
a first end member assembly and a second end member assembly, each comprising an inner end member and an outer end member, wherein the first end member assembly is located adjacent and interconnected with an end of the outer tubular member and is located adjacent a first end of the first internal passage, and wherein the second end member assembly is located adjacent and interconnected with an end of the inner tubular member, and is located adjacent a second end of the first internal passage;
a first spring extending between and interconnected with the inner end member of the first end member assembly and the inner end member of the second end member assembly; and
a second spring extending between and interconnected with the outer end member of the first end member assembly and the outer end member of the second end member assembly.

2. The assembly of claim 1 wherein the inner and outer end members of the first end member assembly are connected to each other, and are secured to the outer tubular member by means of a threaded member extending into a threaded passage provided in the inner end member, the threaded member being mounted to a cap member connected to an end of the outer tubular member.

3. The assembly of claim 1, wherein the inner and outer end members of the second end member assembly are connected to each other, and are secured to the inner tubular member by means of a threaded member extending into a threaded passage provided in the inner end member, the threaded member being mounted to a housing connected to an end of the inner tubular member.

* * * * *